United States Patent [19]
Hellhake et al.

[11] Patent Number: 6,012,761
[45] Date of Patent: Jan. 11, 2000

[54] GRILLE BAR AND RADIATOR FOR A VEHICLE

[75] Inventors: Ferdinand F. Hellhake, Beaverton; Dan Schlesinger, Portland; Thomas Tan Ngoc Nguyen, Clackamas, all of Oreg.

[73] Assignee: Freightliner Corporation, Portland, Oreg.

[21] Appl. No.: 08/718,217

[22] Filed: Sep. 20, 1996

[51] Int. Cl.[7] ................................................. B60R 19/02
[52] U.S. Cl. ......................... 296/180.1; 293/115; 52/473
[58] Field of Search ....................... 293/115; 296/180.1; 52/473, 667, 668, 669; 180/68.6

[56] References Cited

U.S. PATENT DOCUMENTS

| D. 120,297 | 6/1940 | Cadwallader | 293/115 X |
|---|---|---|---|
| 2,050,015 | 8/1936 | Morrison | 293/115 X |
| 2,822,069 | 2/1958 | Morphew | 52/473 |
| 2,905,286 | 9/1959 | Amads et al. | 293/115 X |
| 4,406,489 | 9/1983 | Trabert | 293/115 |
| 4,834,436 | 5/1989 | Nguyen | 180/68.6 X |
| 5,478,127 | 12/1995 | Chase | 296/115 |

FOREIGN PATENT DOCUMENTS

| 63545 | 4/1983 | Japan | 293/115 |
|---|---|---|---|
| 48248 | 3/1984 | Japan | 293/115 |

OTHER PUBLICATIONS

Drawing A17–12622, Freightliner prior art drawing.
Drawing A17–12575, Freightliner prior art drawing.
Drawing A17–12615, Freightliner prior art drawing.
Drawing A17–12118, Freightliner prior art drawing.

*Primary Examiner*—Joseph D. Pape
*Attorney, Agent, or Firm*—Klarquist Sparkman Campbell Leigh & Whinston, LLP

[57] ABSTRACT

A grille bar for a radiator grille of a vehicle includes a grille bar section having a leading profile defining flange portion and a forward or frontal air deflecting surface. The grille bar section also has a rear leg flange portion projecting downwardly from the upper end portion of the leading profile defining flange portion. In addition, the grille bar section has a return flange portion projecting generally rearwardly from the lower end portion of the leading profile defining flange portion. The return flange portion projects preferably rearwardly and upwardly from the lower end portion of the leading profile defining flange portion and extends generally toward the bottom edge of the rear leg flange. The return flange extends in one form to no more than about one-half of the distance between the front of the leading profile defining flange portion and the rear surface of the rear leg. In addition, the rear leg preferably projects no more than one-half of the distance between the upper end of the leading profile defining flange portion and the lower end thereof. The grille bar may be formed by roll forming a single piece of metal.

22 Claims, 6 Drawing Sheets

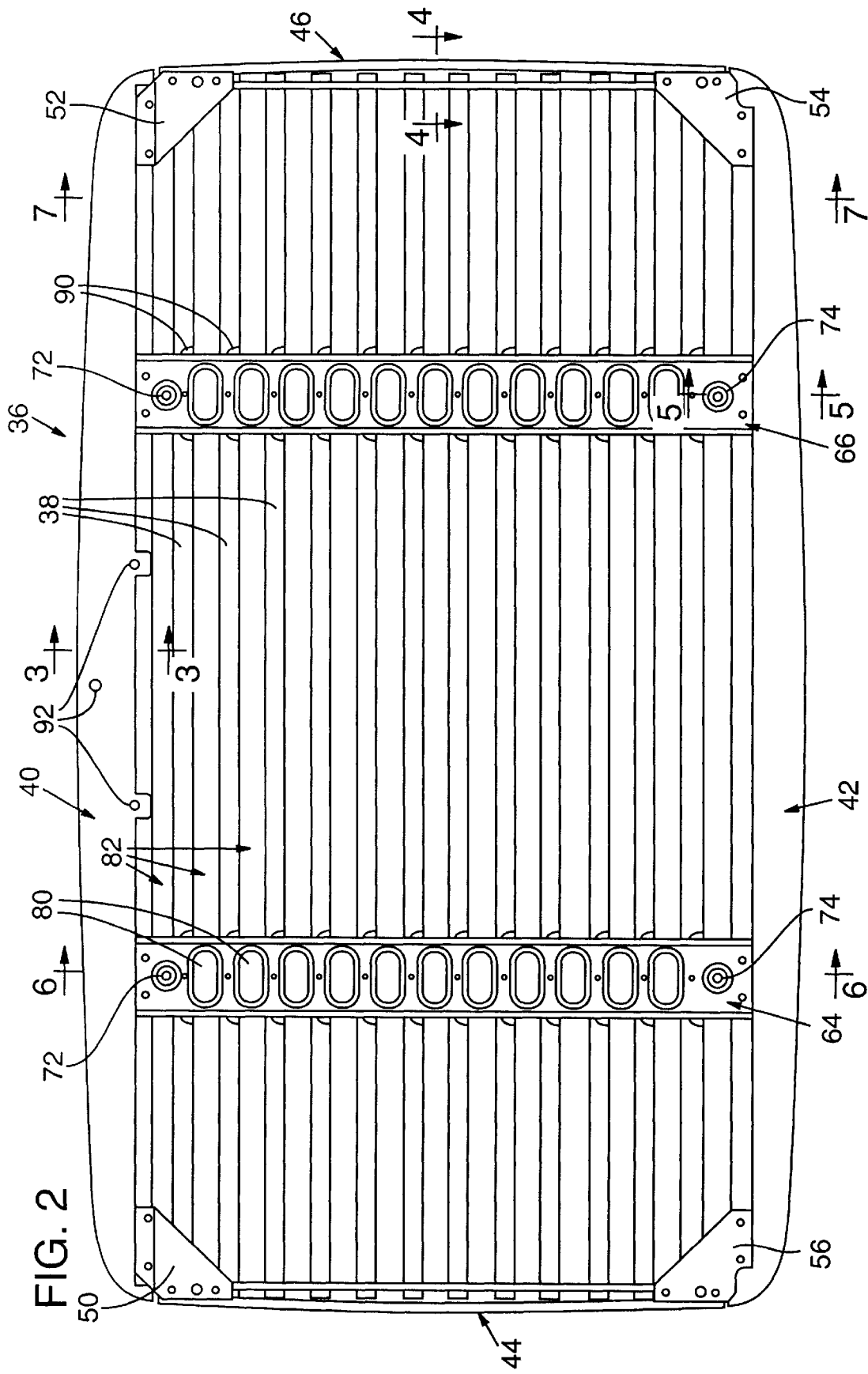

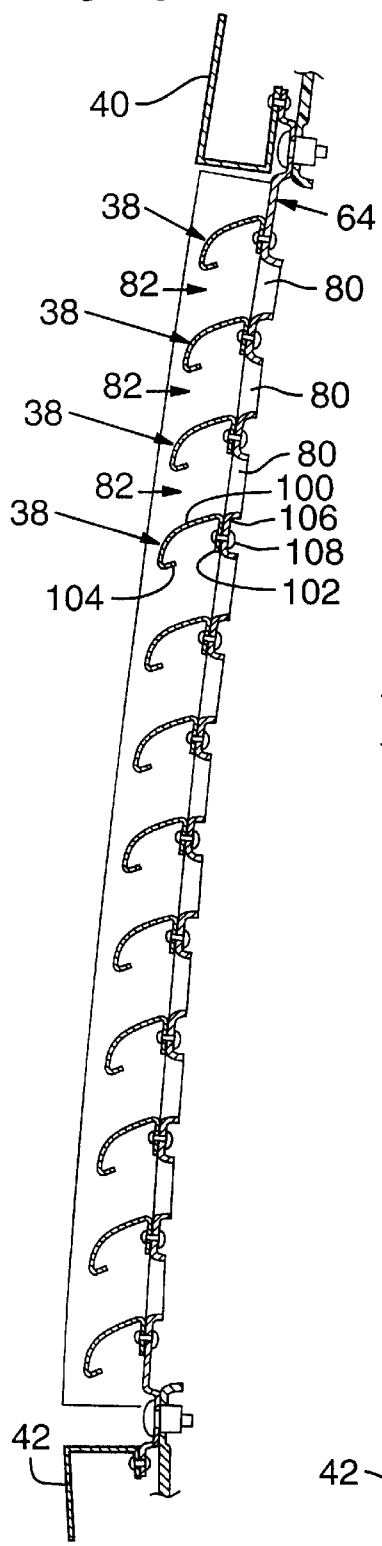
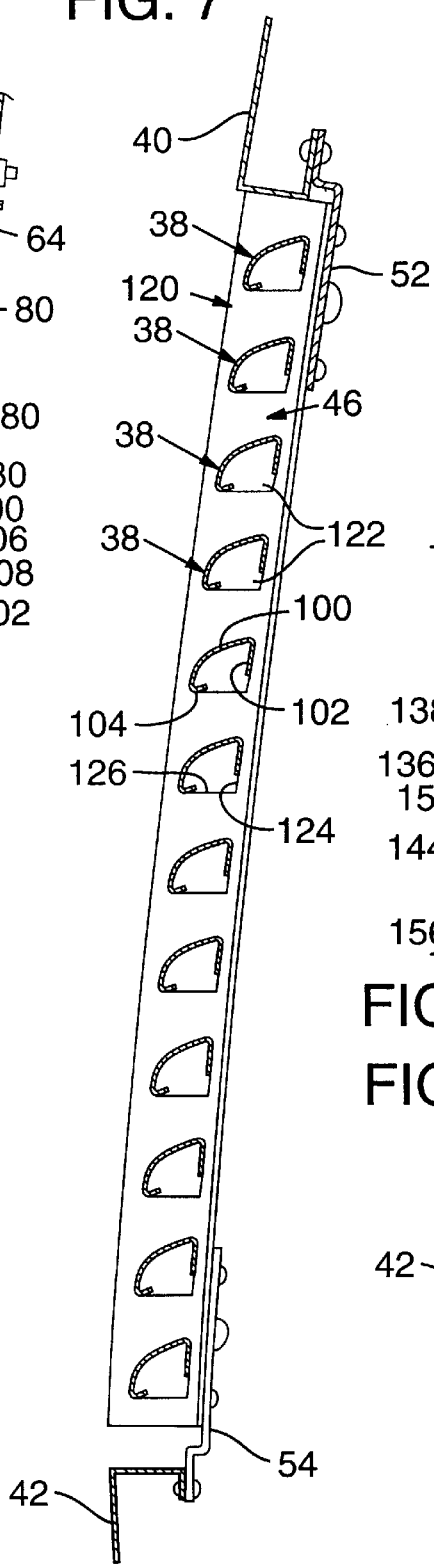
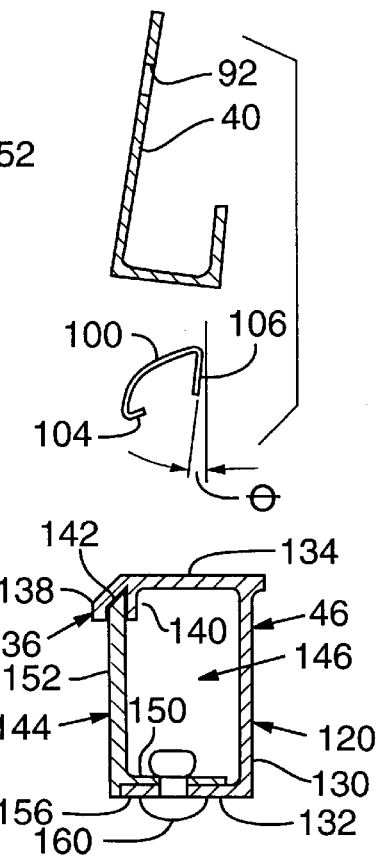
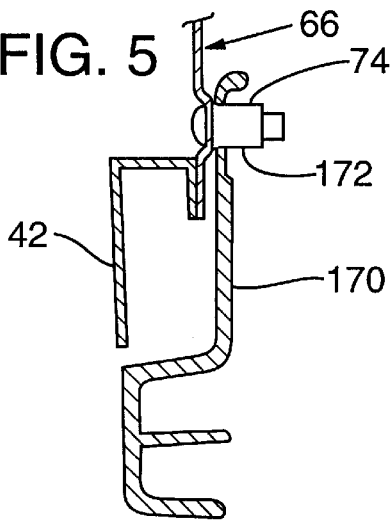

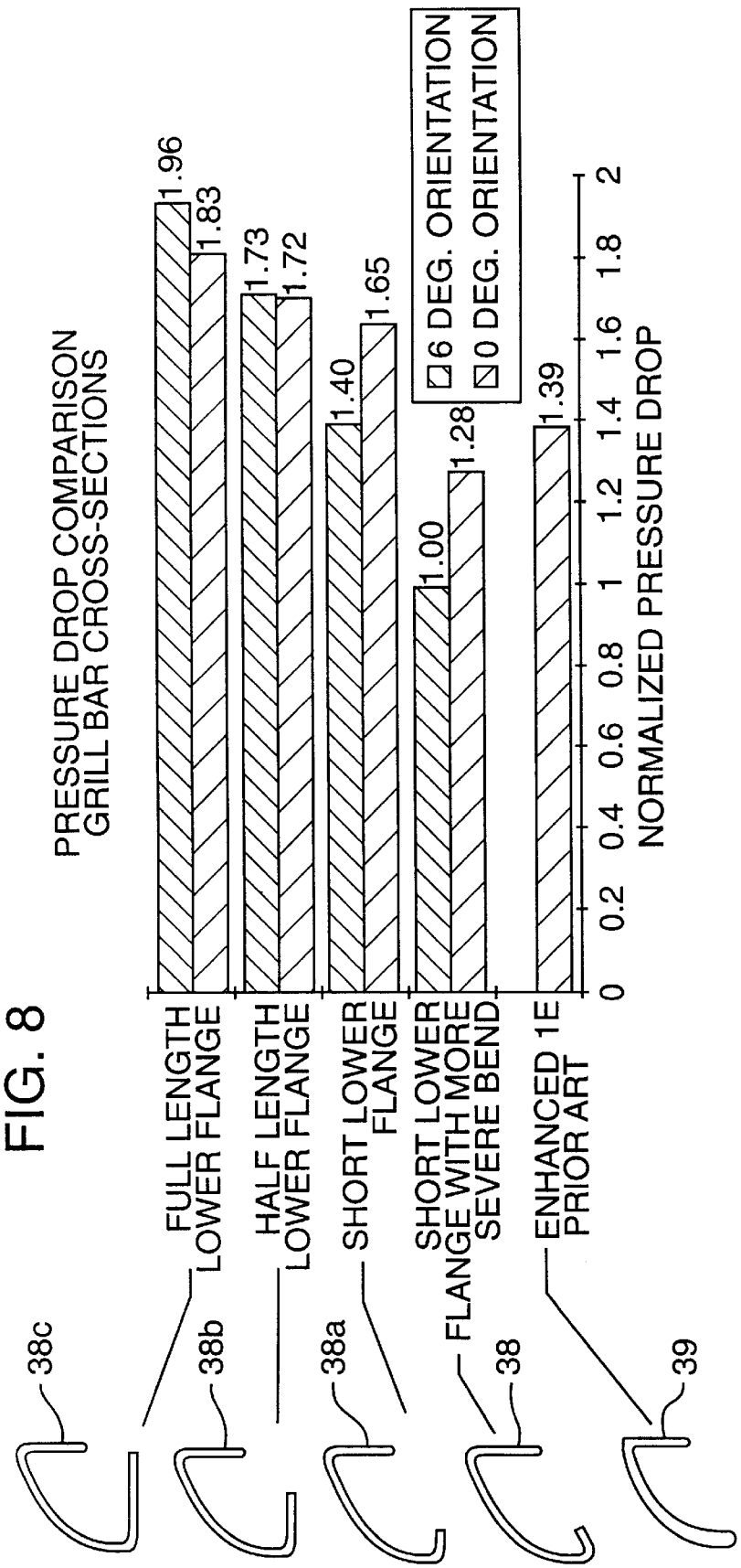

GRILLE BAR AND RADIATOR FOR A VEHICLE

The present invention relates to vehicle grilles and grille bar constructions which are particularly useful in truck radiator grilles.

Trucks and other vehicles commonly have a radiator for cooling engine fluids as well as other fluids. The radiator is typically positioned behind the front surfaces of the truck. A radiator grille overlies the radiator to permit air to flow through the grille and to the radiator, particularly as the vehicle moves forward and/or a cooling fan is on.

As vehicles have become more aerodynamic, the area at the front of the vehicle available for positioning of a grille has been reduced in cross-sectional dimensions. Consequently, it can be difficult to deliver enough air through the grille to the radiator to provide adequate cooling for the vehicle. By reducing the air flow resistance of a grille, the amount of air delivered to the radiator, and thus cooling efficiency is increased. Therefore, a need exists for vehicle radiator grilles and grille bar designs which reduce the aerodynamic drag on air flowing through the grille.

In addition, it is desirable to have grilles which are relatively easy to manufacture and which are durable.

Although prior art grilles exist, a need is present for an improved grille and grille bar design for vehicles which address these and other problems of the prior art.

SUMMARY OF THE INVENTION

The present invention relates to a grille for a vehicle, and in particular to a truck radiator grille and to improved grille bar designs. The radiator grille includes a frame with transversely extending grille bars which are elongated and typically span the frame from one side to the other. The grille bars in the preferred embodiment of the present invention have an elongated grille bar section with a leading profile defining flange with a forward or frontal air deflecting surface and upper and lower end portions. In addition, the grille bar section has a rear leg flange projecting downwardly from the upper portion of the leading profile defining flange. Furthermore, the grille bar section has a return flange which projects generally rearwardly from the lower end portion of the leading profile defining flange portion.

In a most preferred form of the invention, the return flange projects rearwardly and upwardly from the lower end portion of the leading profile defining flange. In accordance with yet another aspect of the illustrated embodiment of the present invention, the return flange has upper and lower surfaces and the leg flange has a bottom edge. The return flange in this case has a lower surface positioned generally in a plane which intersects the bottom edge of the leg flange.

Most preferably, the return flange projects rearwardly less than one-half, and most preferably less than one-third, of the horizontal distance between a rear surface of the leg flange and the lower forward-most portion of the frontal air deflecting surface.

In accordance with another more specific aspect of the illustrated embodiment of the present invention, the leading profile defining flange has a lower section which transitions through a reverse bend into the return flange. In addition, the leading profile defining flange portion has an upper section which transitions through a downward bend to the leg flange portion.

The leg flange in the most preferred form of the invention provides a mounting surface for connection to support brackets of the grille radiator frame. The leg flange preferably extends about one-half of the vertical distance between the uppermost and lowermost end portions of the leading profile defining flange.

The preferred form of frontal air deflecting surface includes an upper section of a first radius, a central section of a second radius less than the first radius, and a lower section of a third radius which is intermediate to the first and second radii. The frontal air deflecting air surface is preferably of an air foil shape.

When assembled into a radiator grille and mounted to a vehicle, in the most preferred form of the invention the rear leg flanges of the grille bars are not necessarily vertical. More specifically, the rear leg flange of the plurality of grille bars forming the radiator grille are tilted forward an average of six degrees from vertical in one specific example.

It is therefore one object of the present invention to provide an improved grille bar which provides a reduced resistance to air flow through a grille constructed of such grille bars.

It is another object of the present invention to provide a radiator grille constructed of a plurality of grille bars of enhanced air passing efficiency.

Yet another object of the present invention is to provide a durable grille for a vehicle which is relatively easy to manufacture. For example, the grille bar sections may be roll-formed of metal instead of extruded.

The present invention relates to the above features, advantages and objects, both individually and collectively.

BRIEF DESCRIPTION OF THE DRAWINGS

FIG. 2 is a rear view of the radiator grille included in the truck of FIG. 1.

FIG. 3 is a vertical sectional view, taken along line 3—3 of FIG. 2, illustrating an upper cross piece portion of the grille of FIG. 2.

FIG. 4 is a horizontal sectional view, taken along line 4—4 of FIG. 2, illustrating a side frame construction for the grille of FIG. 2.

FIG. 5 is a vertical sectional view of a lower cross piece portion of the grille taken along Line 5—5 of FIG. 2.

FIG. 6 is a vertical sectional view, taken along line 6—6 of FIG. 2, illustrating the coupling of grille bars to a support bracket extending between the upper and lower grille cross piece portions.

FIG. 7 is a vertical sectional view, taken along line 7—7 of FIG. 2, illustrating the insertion of the grille bars into the side frame pieces of the grille of FIG. 2.

FIG. 8 is a graphical representation of finite element modeling determined pressure drop comparisons (which indicate wind resistance) of grille bars of various cross sections.

DESCRIPTION OF PREFERRED EMBODIMENT

Figure 1:
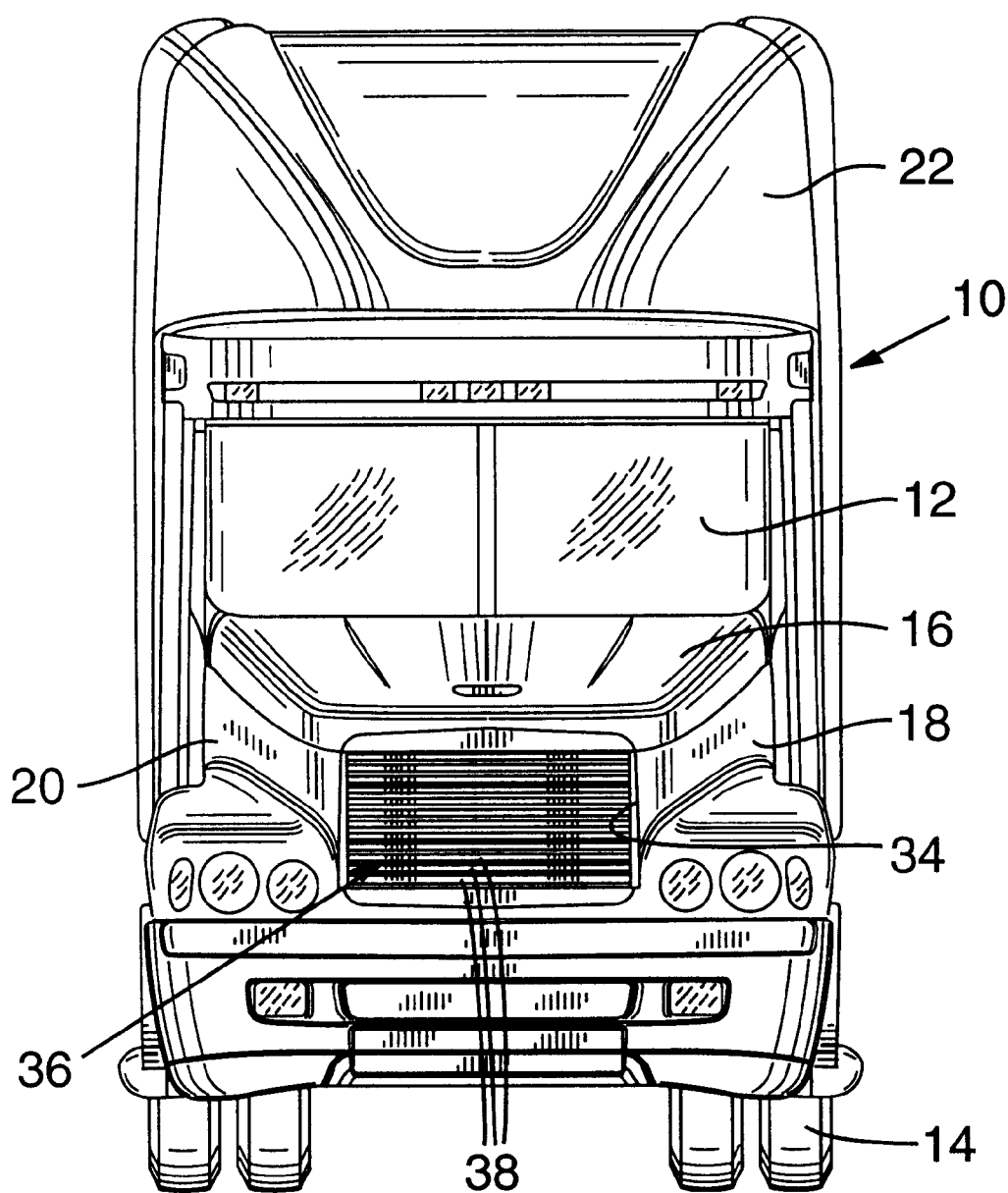
FIG. 1 is a front perspective view of a truck incorporating one form of a radiator grille of the present invention.

As shown in FIG. 1, a vehicle, in this case a truck 10, has a cab with a windshield 12. The truck 10 is supported by wheels 14. The truck includes a hood 16 and first and second side fenders 18, 20.

The truck 10, which may take other forms, also includes a raised roof section 22. The truck shown in FIG. 1 has a hood and fenders which taper toward the front of the vehicle. The hood and side fenders together define an opening 34 which is generally rectangular in this illustrated example. The radiator of the truck (not shown) sits behind the opening 34. A radiator grille 36 in accordance with a preferred embodiment of the present invention overlies the opening 34 and thus is positioned forwardly of the radiator.

As the vehicle travels in a forward direction, and/or a cooling fan (not shown) is operated, air impinges the front of the grille. The grille 36 includes a plurality of elongated grille bars, two of which are indicated at 38, which are spaced apart to allow the passage of air between the grille bars to the radiator for cooling purposes. As the nose or front portion of vehicles become smaller (e.g. due to the tapering fenders and hoods), it can become more difficult to deliver a sufficient amount of air to the radiator to effectively cool the cooling fluids which circulate through the radiator. Consequently, it is desirable to provide a radiator grille of a design providing a reduced air flow resistance.

With reference to FIG. 2, the illustrated grille 36 includes parallel spaced apart upper and lower transversely extending elongated frame elements or cross pieces 40, 42. In addition, the grille 36 includes upright side frame elements 44, 46 which are also spaced apart and elongated. The frame elements 40–46 are interconnected at their respective corners by corner braces 50–56 to provide an interconnected frame. In the FIG. 2 configuration, the frame is generally rectangular. The frame also includes a pair of upright, preferably vertical, spaced apart grille bar supporting members or brackets 64, 66. The brackets 64, 66 each include respective upper and lower mounts 72, 74 through which bolts or other fasteners extend to mount the assembled radiator grille to the vehicle 10.

The brackets 64 most preferably include air resistance reducing openings, some of which are indicated at 80, which are located to line up with the spaces (some being indicated at 82) between the respective grille bars 38. Consequently, the wind resistance otherwise provided by the brackets is reduced.

The grille bars 38 may have a bent section in the region of brackets 64, 66, such as indicated at 90 for several of the grille bars, to give the grille a distinctive, recognizable trademark appearance indicating the source of origin of the vehicle from Freightliner Corporation, the assignee of the present invention. The remaining major sections of the grille bars are not bent. The upper frame element 40 includes plural openings indicated at 92 to which a name plate for the vehicle manufacturer may be mounted.

With reference to FIG. 6, the interconnection of a plurality of grille bars 38 to the brackets 64, 66 (in this case with reference to bracket 64) is shown. Each of the grille bars 38 include a leading profile defining flange portion 100, a rear leg flange portion 102, and a return flange portion 104. A more detailed description of the grille bars 38 included in the grille is set forth below in connection with FIG. 9. The rear leg flange 102 is generally upright and is positioned to abut a support piece 106 of the bracket 64. A fastener, such as a rivet 108 or other fastener, is used to secure the rear leg flange 102 to the support bracket 106 to thereby rigidly and securely mount the grille bar 38 to the bracket 64. In the same manner, each of the other grille bars 38 may be mounted to the bracket 64 and also to the bracket 66.

FIG. 7 illustrates one form of a grille side frame element 46. Element 46 includes an upright inner grille bar support 120 having a plurality of openings or pockets 122. A few of such pockets 122 are numbered in FIG. 7. The pockets have boundaries which may be configured to match the outer configuration of the grille bars. Each pocket 122 receives the end of an associated grille bar. That is, the pockets 122 may include a generally upright rear bounding surface 124 and a curved front surface 124 which matches the contour of the outer air deflection surface of the leading profile defining flange portion.

With reference to FIG. 4, the grille bar support 120 may be generally of a U-shaped construction having a face or base 130 and a pair of spaced apart parallel legs 132, 134 projecting outwardly from the base 130 in a common direction. The leg 134 has a distal or free end portion 136 which includes a pair of flanges 138, 140 projecting orthogonally from the leg 134 toward the leg 132. The legs 138, 140 define a flange end receiving slot 142 angled at its base as shown in FIG. 4.

The illustrated side frame element 46 includes a second or outer upright element 144 which interconnects with the side frame support 120 to lock side frame components 120, 144 together. This locking is assisted by the overlapping nature of leg 150 and leg 132, and also by the interfit of the end of leg flange 152 into the slot 142. Plural fasteners, such as rivets 160 spaced along the length of the side components, hold components 120, 144 together.

Although numerous side frame constructions may be used, the illustrated construction is not only aesthetically pleasing, but also provides a rigid side rail element into which the grille bar receiving pockets may be formed. Also, the boxlike construction of side frame elements 120, 144 provides a compartment or chamber 146 within which the ends of the grille bars terminate. Therefore, sharp edges at the ends of the grille bars are shielded from contact by someone reaching their hands past the grille. The grille bar ends are also visually shielded.

With reference to FIG. 3, the grille bars 38 (one being shown in FIG. 3) are typically oriented such that when the radiator grille is mounted to a vehicle, the rear leg flange portions 106 are not vertical. That is, on average, the rear surface of leg flange portion, and thus the leg flange portion, is tilted forward from vertical by an angle θ. The angle θ preferably averages six degrees in the illustrated embodiment of the present invention. Of course, the grille bars need not be positioned in such an orientation. Thus, for example, although less preferred, the rear leg flange 106 may be vertical or at some other attitude.

FIG. 5 illustrates the side support bracket 66 and the coupling 74 in one form which may be used to connect the grille to the vehicle components 170 surrounding the grille receiving opening of the vehicle. Mount 74 preferably includes an isolator 172 of rubber or other resilient material positioned to separate the grille, and more particularly the metal components of the grille, such as bracket 66 and lower frame piece 42, from the vehicle surfaces to which the grille is mounted. A bolt or other fastener mounts the grille in place, as shown in FIG. 5. The mounts 72, 74 may be similarly constructed.

To model the wind resistance of the grille bars, a two-dimensional mathematical finite element modeling of the pressure drop across grille bars of a vehicle was performed. The critical cooling scenario for heavy trucks typically occurs when one is negotiating a steep hill at a low speed. At climbing speeds, the radiator flow due to ram effects from the motion of the truck is not believed significant. That is, the speed of air entering the radiator grille under such conditions is primarily determined by the air drawn in by the vehicle cooling fan. By selecting a horizontal air inflow in the model at a speed of 27.2 miles per hour, the modeling analysis simulates this critical scenario. The vertical air velocity in the model was assumed to be zero. Also, the horizontal inlet velocity of 27.2 miles per hour was applied to the forward edge of the domain. The velocity around the perimeter of the grille bar was constrained to zero and the pressure at the outlet was also maintained at zero. The upper and lower boundaries of the calculation domain in the model were located at the centers of the gaps between adjacent grille bars. To simulate the effects of the adjacent grille bars, periodic boundary conditions for all degrees of freedom were applied to the top and bottom edges of the domain. The two-dimensional model thus simulated an infinitely wide array of grille bars stacked infinitely high. Although flow through a grille is three-dimensional in nature, at a low air inlet speed (e.g. 27.2 miles per hour arising from the fan), the two-dimensional modeling approach is expected to be reasonable. The model also excluded the effect of the radiator.

FIG. 8 illustrates cross sections of grille bar configurations that were analyzed using the model. Grille bars 38 (the most preferred) and 38A–38C are example grille bar configurations of the present invention. Grille bar 39 is a prior art extruded grille bar construction.

Due to the curvature of the grille in the preferred embodiment of the present invention, each of the first four grille cross sections 38–38C were evaluated at two different angles of attack. The performance of each grille bar cross section was evaluated by noting the steady-state pressure developed at the inlet. The six degree orientation was selected (e.g. θ at six degrees in FIG. 3) because the curvature of the grille in the preferred embodiment caused the average angle of attack of each of the grille bars to be about six degrees. The zero degree orientation was also modeled as some of the grille bars would be positioned with the rear leg vertical or at a zero degree angle of attack.

The lower-most grille bar 39 of FIG. 8 (labeled Enhanced 1E) again is a prior art extruded grille bar cross section heretofore sold in Freightliner Corporation vehicles. Such vehicles had a grille with a rear leg oriented vertically. Consequently, the modeling for the Enhanced 1E grille bar 39 configuration was only performed at a zero degree rear leg orientation as that was the orientation of the grille bars in this prior art grille. The finite modeling analysis was performed on an SGI Indigo workstation using the finite element code Fidap. A k–ε turbulence simulation was used with a typical model size of 4300 elements.

Figure 10:
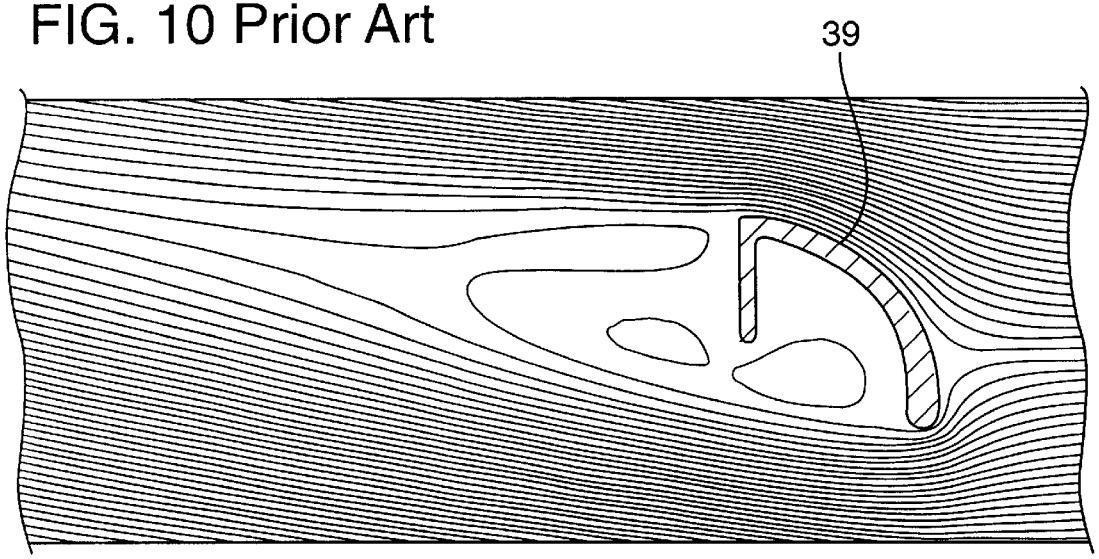
FIG. 10 is a schematic illustration of streamlines associated with a grille bar of a prior art extruded construction.
Figure 11:
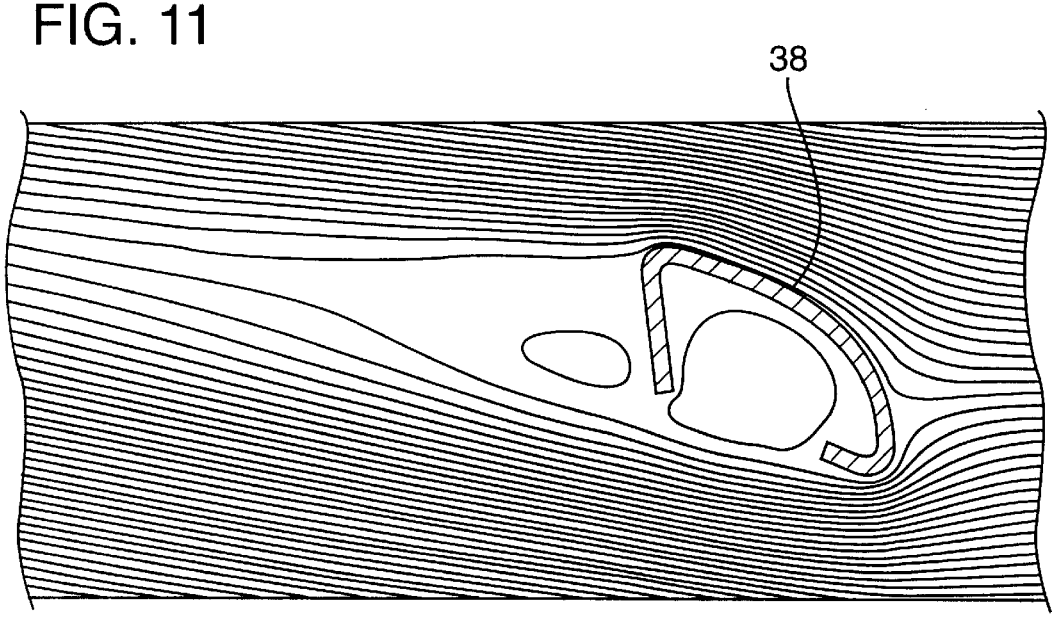
FIG. 11 is a schematic illustration of streamlines associated with a grille bar having a cross section of FIG. 9.

FIGS. 10 and 11 show a comparison of the predicted (from the modeling) streamlines for the respective grille bar sections 39 (FIG. 10) and 38 (FIG. 11). Within each individual plot, the flow rate between streamlines is constant. A reduction in flow is therefore indicated when the distance between adjacent streamlines grows. Conversely, the flow velocity increases as the streamlines become more packed together. An arbitrary number of streamlines are shown. In the streamline plots, the overall performance of the grille bar section is indicated by the extent of the stagnation and recirculation behind the grille bar. The least effective configuration (not shown in FIGS. 10 and 11) is for the configuration 38C of FIG. 8. The most effective configuration is configuration 38, shown in FIG. 11. The recirculation zone is minimized and the streamline spacing is the most uniform. Also, the predicted direction of air flow in FIG. 11 is upwardly beyond the lower return flange of this grille bar.

FIG. 8 shows the normalized pressure drops predicted (from the modeling) for grille bar configurations 38–38C and 39. The configuration 38 with the shorter lower or return flange produced the lowest predicted pressure losses. For the short return flange configuration 38, the six degree orientation (in FIG. 3) is more efficient than the zero degree orientation. As the return flange length increased, this trend eventually reversed itself with the zero degree orientation producing lower pressure losses than the six degree orientation for the given grille bar configuration. That is, in configurations 38 and 38A, the six degree orientation was more efficient than the zero degree orientation. The six degree orientation became less efficient than the zero degree orientations for the 38 and 38C configurations. FIG. 8 clearly shows the expected improved results of the grille bar 38 design over the prior art grille bar 39 design.

Figure 9:
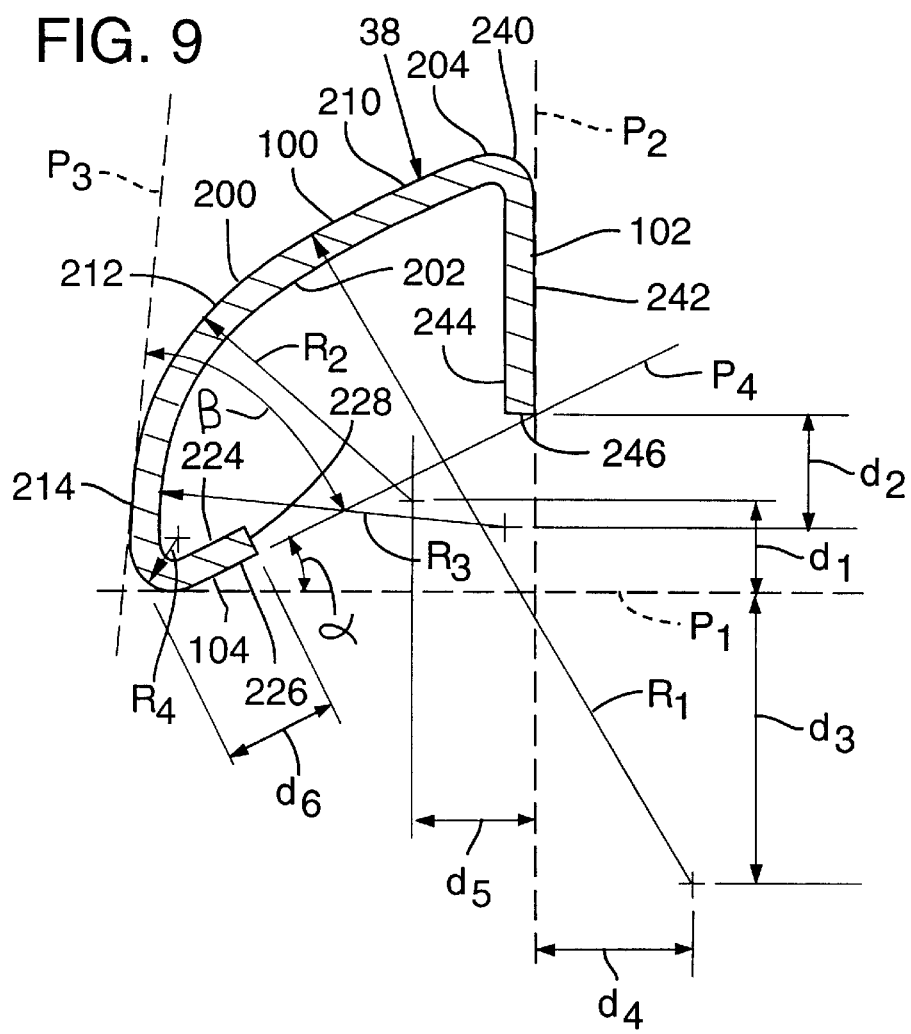
FIG. 9 is a cross-sectional view through a section of a grille bar in accordance with one form of the present invention.

A preferred cross sectional configuration for the grille bar 38 is illustrated in FIG. 9. In FIG. 9, the leading profile defining flange portion 100 includes a forward or frontal air deflecting surface 200 as well as an opposed interior surface 202. The leading profile defining flange portion 100 includes upper and lower end portions 204, 202. In addition, the frontal air deflecting surface 200 is preferably of an air foil shape. In the illustrated embodiment, the lower end portion 202 of flange portion 100 extends downwardly to a transition region at which a return bend is formed to provide the return flange 104. The radius of the return bend is indicated as R4. The upper end portion 204 extends upwardly to a transition region at which a downward bend is formed to provide the leg flange 102.

The return flange 104 has an upper surface 224 and a lower surface 226 and terminates in an end surface 228. The lower surface 226 is generally in a plane indicated as P4 in this figure. The lower section 214 of the flange portion 100 is intersected by a plane P3 which also intersects the plane P4 at an angle β. The angle β between plane P3 and P4 is preferably an acute angle and most preferably about fifty degrees. In addition, the angle between plane P4 and a horizontal plane P1, indicated as angle α in FIG. 9, is preferably also acute with twenty-seven degrees being a specifically preferred example. The leg flange portion 102 projects downwardly from the upper end portion 204 of the leading profile defining flange portion 100. That is, a bend is formed at location 240 where the flange changes from the leading flange portion to the rear leg portion. The rear leg portion includes a rear major surface 242 and an interior or front major surface 244 and terminates in an end or lower edge surface 246. In FIG. 9, the rear leg surface 242 is oriented in plane P2 which is vertical and perpendicular to the plane P1.

As can be seen in FIG. 9, the return flange portion 104 extends in a direction toward the lower end of the leg flange 102. In a most preferred embodiment, the plane containing the lower surface 226 of return flange 104 also intersects the bottom edge 246 of the rear leg 102. It should be noted that, with the orientation shown in FIG. 9, the lower surface of the return flange 104 forms the base of an air foil configuration with the upper surface of the air foil being defined by the frontal air deflecting surface 200 of flange portion 100. Frontal air deflecting surface 200 is generally of a convex configuration. In the preferred form, the air deflecting surface 200 has an upper section 210 of a first radius $R_1$, a central section 212 of a second radius $R_2$ and a lower section 214 of a third radius $R_3$. In the illustrated embodiment, $R_1$ is greater than $R_3$, and $R_2$ is the smallest of these three radii. Also, the rear surface 242 of leg flange appears to be flat in FIG. 9, but it actually may have a small radius of curvature (e.g. 5928.5 meters). The preferred manner of constructing the grille bars 38 is to roll form them from flat metal bars. An exemplary preferred material is aluminum.

Although variable, in the preferred grille bar embodiment of the present invention, the leg flange does not project any more than about one-half of the distance between the upper portion 204 of flange 100 and the lower portion 202 of the flange 100. Also, it is preferred that the horizontal distance of projection (along plane $P_1$) of the return flange 104 be less than one-half, and most preferably no less than about one-third of the horizontal distance between the front edge 202 of the grille bar and the rear edge 242.

Dimensions of the illustrated preferred embodiment of the present invention are set forth in the table below. These dimensions may be varied without departing from the principles of the present invention.

| | |
|---|---|
| d1 | 3.7 mm |
| d2 | 5.1 mm |
| d3 | 22.5 mm |
| d4 | 13.0 mm |
| d5 | 5.3 mm |
| d6 | 5.0 mm |
| R1 | 44.0 mm |
| R2 | 12.0 mm |
| R3 | 17.5 mm |
| R4 | 2.0 mm |

As will be apparent from the foregoing description, a grille bar and grille of the present invention is extremely aerodynamically efficient. In addition, the grille bars may be easily manufactured, such as by roll forming the grille bars from respective pieces of flat aluminum stock.

Having illustrated and described the principles of our invention with reference to preferred embodiments, it should be apparent to those of ordinary skill in the art that the invention may be modified in arrangement and detail without departing from such principles. We claim as our invention all such modifications as fall within the scope of the following claims.

Claims:

1. A grille bar for the grille of a vehicle comprising: an elongated grille bar section having a leading profile defining flange portion with a convex forward or frontal air deflecting surface and upper and lower end portions, the frontal air deflecting surface being convex over a majority of the frontal air deflecting surface between the upper and lower portions;

the grille bar section having a rear leg flange portion projecting downwardly from the upper end portion of the leading profile defining flange portion; and the grille bar section having a return flange portion projecting generally rearwardly from the lower end portion of the leading profile defining flange portion.

2. A grille bar according to claim 1 which is of a single piece of roll formed metal.

3. A grille bar according to claim 1 in which the return flange portion projects rearwardly and upwardly from the lower end portion of the leading profile defining flange portion, and wherein the return flange portion is directly attached to the lower end portion of the leading profile defining flange portion.

4. A grille according to claim 3 in which the rear leg flange has a bottom edge and in which the return flange portion projects rearwardly and upwardly toward the bottom edge of the rear leg flange.

5. A grille according to claim 4 in which the return flange has upper and lower surfaces, the lower surface of the return flange being generally in a plane which intersects the bottom edge of the leg flange.

6. A grille bar according to claim 3 in which the rear leg flange portion includes opposed forward and rear leg surfaces and a bottom edge surface, and wherein the return flange portion projects rearwardly less than one-half of the horizontal distance between the rear leg surface and the lower forward-most portion of the frontal air deflecting surface.

7. A grille bar according to claim 3 in which the leading profile defining flange portion has a lower section which transitions through a reverse bend to the return flange portion and in which the return flange portion has a lower surface, and wherein the angle between a plane containing the lower surface of the return flange portion and a plane intersecting the air deflection surface of the lower section at a location above the transition is acute.

8. A grille bar according to claim 2 in which the return flange extends upwardly at an acute angle relative to the leading profile defining flange portion.

9. A grille bar for the grille of a vehicle comprising:

an elongated grille bar section having a leading profile defining flange portion with a forward or frontal air deflecting surface and upper and lower end portions;

the grille bar section having a rear leg flange portion projecting downwardly from the upper end portion of the leading profile defining flange portion;

the grille bar section having a return flange portion projecting generally rearwardly from the lower end portion of the leading profile defining flange portion; and the rear leg flange portion including opposed forward and rear leg surfaces and a bottom edge surface, and wherein the return flange portion projects rearwardly less than one-third of the horizontal distance between the rear leg surface and the lower forward-most portion of the frontal air deflecting surface.

10. A grille bar for the grille of a vehicle comprising:

an elongated grille bar section having a leading profile defining flange portion with a forward or frontal air deflecting surface and upper and lower end portions;

the grille bar section having a rear leg flange portion projecting downwardly from the upper end portion of the leading profile defining flange portion;

the grille bar section having a return flange portion projecting generally rearwardly from the lower end portion of the leading profile defining flange portion;

wherein the return flange portion projects rearwardly and upwardly from the lower end portion of the leading profile defining flange portion; and the leading profile defining flange portion has a lower section which transitions through a reverse bend to the return flange portion and in which the return flange portion has a lower surface, and wherein the angle between a plane containing the lower surface of the return flange portion and a plane intersecting the air deflection surface of the lower section at a location above the transition is acute; and wherein the angle is about fifty degrees.

11. A grille bar for the grille of a vehicle comprising:

an elongated grille bar section having a leading profile defining flange portion with a convex forward or frontal air deflecting surface and upper and lower end portions;

the grille bar section having a rear leg flange portion projecting downwardly from the upper end portion of the leading profile defining flange portion;

the grille bar section having a return flange portion projecting generally rearwardly from the lower end portion of the leading profile defining flange portion; and the rear leg flange having a bottom edge and wherein the bottom edge of the rear leg flange extends about one-half of the vertical distance between the uppermost and lowermost end portions of the leading profile defining flange portion.

12. A grille bar for the grille of a vehicle comprising:

an elongated grille bar section having a leading profile defining flange portion with a convex forward or frontal air deflecting surface and upper and lower end portions;

the grille bar section having a rear leg flange portion projecting downwardly from the upper end portion of the leading profile defining flange portion;

the grille bar section having a return flange portion projecting generally rearwardly from the lower end portion of the leading profile defining flange portion; and the rear leg flange having a bottom edge and wherein the bottom edge of the rear leg flange extends about one-half of the vertical distance between the uppermost and lowermost end portions of the leading profile defining flange portion.

13. A grille bar according to claim 12 in which the return flange extends upwardly at an acute angle relative to the leading profile defining flange portion.

14. A grille bar for the grille of a vehicle comprising:

an elongated grille bar section having a leading profile defining flange portion with a forward or frontal air deflecting surface and upper and lower end portions;

the grille bar section having a rear leg flange portion projecting downwardly from the upper end portion of the leading profile defining flange portion; and the grille bar section having a return flange portion projecting generally rearwardly from the lower end portion of the leading profile defining flange portion; and the frontal air deflecting surface includes an upper section having a first radius, a central section having a second radius less than the first radius, and a lower section of a third radius which is intermediate to the first and second radii.

15. A grille bar for the grille of a vehicle comprising:

a grille bar section having a leading profile defining flange portion with a forward or frontal air deflecting surface and upper and lower end portions;

the grille bar section having a rear leg flange portion projecting downwardly from the upper end portion of the leading profile defining flange portion;

the grille bar section having a return flange portion projecting generally rearwardly and upwardly from the lower end portion of the leading profile defining flange portion, the return flange portion having a lower surface;

the lower surface of the return flange portion and the frontal air deflecting surface being in an air foil configuration;

the rear leg flange portion including opposed forward and rear leg surfaces and a bottom edge, the return flange portion projecting rearwardly less than one-third of the horizontal distance between the rear leg surface and the lower forward-most portion of the frontal air deflecting surface, wherein the bottom edge of the rear leg flange extends about one-half of the vertical distance between the uppermost and lowermost end portions of the leading profile defining flange portion; and wherein the return flange portion projects rearwardly and upwardly from the lower end portion of the leading profile defining flange portion.

16. A grille frame with elongated grille bars according to claim 15 mounted so as to extend transversely across the frame.

17. A vehicle grille comprising:

a frame;

a plurality of transversely extending elongated grille bars mounted to the frame;

the grille bars each having a substantial length comprised of:

a grille bar section having a leading profile defining flange portion with a convex forward or frontal air deflecting surface and upper and lower end portions, the frontal air deflecting surface being convex over at least a majority of the surface between the upper and lower end portions;

the grille bar section having a rear leg flange portion projecting downwardly from the upper end portion of the leading profile defining flange portion;

the grille bar section also having a return flange portion projecting generally rearwardly and upwardly from the lower end portion of the leading profile defining flange portion, the return flange portion having a lower surface;

the rear leg flange portion including opposed forward and rear leg surfaces and a bottom edge, the return flange portion projecting rearwardly less than one-half of the horizontal distance between the rear leg surface and the lower forward-most portion of the frontal air deflecting surface; and wherein the return flange extends upwardly at an acute angle relative to the leading profile defining flange portion.

18. A grille according to claim 17 in which the lower surface of the return flange portion and the frontal air deflecting surface are in an air foil configuration with at least a majority of the frontal air deflecting surface being convex.

19. A vehicle grille comprising:

a frame;

a plurality of transversely extending elongated grille bars mounted to the frame;

the grille bars each having a substantial length comprised of:

a grille bar section having a leading profile defining flange portion with a convex forward or frontal air deflecting surface and upper and lower end portions;

the grille bar section having a rear leg flange portion projecting downwardly from the upper end portion of the leading profile defining flange portion;

the grille bar section also having a return flange portion projecting generally rearwardly and upwardly from the lower end portion of the leading profile defining flange portion, the return flange portion having a lower surface;

the rear leg flange portion including opposed forward and rear leg surfaces and a bottom edge, the return flange portion projecting rearwardly less than one-half of the horizontal distance between the rear leg surface and the lower forward-most portion of the frontal air deflecting surface; and wherein the return flange extends upwardly at an acute angle relative to the leading profile defining flange portion; and the rear leg flange having a bottom edge and wherein the bottom edge of the rear leg flange extends about one-half of the vertical distance between the uppermost and lowermost end portions of the leading profile defining flange portion.

20. A vehicle grille comprising:

a frame;

a plurality of transversely extending elongated grille bars mounted to the frame;

the grille bars each having a substantial length comprised of:
  a grille bar section having a leading profile defining flange portion with a forward or frontal air deflecting surface and upper and lower end portions;

the grille bar section having a rear leg flange portion projecting downwardly from the upper end portion of the leading profile defining flange portion;

the grille bar section also having a return flange portion projecting generally rearwardly and upwardly from the lower end portion of the leading profile defining flange portion;

the rear leg flange portion including opposed forward and rear leg surfaces and a bottom edge, the return flange portion projecting rearwardly less than one-half of the horizontal distance between the rear leg surface and the lower forward-most portion of the frontal air deflecting surface; and wherein the return flange extends upwardly at an acute angle relative to the leading profile defining flange portion; and the return flange portion projecting rearwardly less than one-third of the horizontal distance between the rear leg surface and the lower forward-most portion of the frontal air deflecting surface.

21. A vehicle having a vehicle grille of claim 20 mounted thereto.

22. A grille according to claim 20 wherein when the grille is mounted to the vehicle, the rear leg flange portions are tilted forward an average of about six degrees from vertical.

* * * * *